United States Patent [19]

Distaso

[11] Patent Number: 5,387,363
[45] Date of Patent: Feb. 7, 1995

[54] WATER IN OIL EMULSIONS

[75] Inventor: John Distaso, Orange, Calif.

[73] Assignee: Elf Atochem North America, Inc., Philadelphia, Pa.

[21] Appl. No.: 111,812

[22] Filed: Aug. 25, 1993

Related U.S. Application Data

[63] Continuation of Ser. No. 892,458, Jun. 2, 1992, abandoned.

[51] Int. Cl.$^6$ ................................................ C09D 9/02
[52] U.S. Cl. ...................................... 252/163; 252/144
[58] Field of Search ................................ 252/163, 144

[56] References Cited

U.S. PATENT DOCUMENTS

| | | | |
|---|---|---|---|
| 1,675,227 | 6/1928 | Reeve | 252/DIG. 8 |
| 3,356,614 | 12/1967 | Gilbert | 252/171 |
| 3,538,007 | 11/1970 | Cooper et al. | 252/144 |
| 3,702,304 | 11/1972 | Esposito | 252/171 |
| 3,979,219 | 9/1976 | Chang et al. | 106/271 |
| 3,983,047 | 9/1976 | Vinson | 252/119 |
| 4,055,433 | 10/1977 | Morones | 106/10 |
| 4,163,673 | 8/1979 | Dechert | 106/11 |
| 4,269,724 | 5/1981 | Hodson | 252/171 |
| 4,445,939 | 5/1984 | Hodson | 134/2 |
| 4,559,150 | 12/1985 | Becker et al. | 252/8.6 |
| 4,822,723 | 4/1989 | Philler | 430/331 |
| 4,909,962 | 3/1990 | Clark | 252/517 |
| 5,015,410 | 5/1991 | Sullivan | 252/166 |

FOREIGN PATENT DOCUMENTS

| | | | |
|---|---|---|---|
| 16060 | 8/1903 | United Kingdom | 252/169 |
| 2167083 | 5/1986 | United Kingdom . | |

*Primary Examiner*—Arthur C. Prescott
*Attorney, Agent, or Firm*—Stanley A. Marcus; William D. Mitchell

[57] ABSTRACT

Retardation of the rate of evaporation of water in oil emulsions by incorporating in the organic phase thereof an effective amount of paraffin wax.

13 Claims, No Drawings

WATER IN OIL EMULSIONS

This is a continuation of copending application Ser. No. 07/892,458, filed on Jun. 2, 1992, now abandoned.

FIELD OF THE INVENTION

The present invention relates to water-in-oil emulsions having reduced rates of evaporation, especially to methods for the reduction of evaporation therefrom by the inclusion of paraffin wax and to compositions such as paint strippers containing such emulsions.

BACKGROUND OF THE INVENTION

This invention has many possible applications where water-in-oil emulsions can be used since it reduces odors of the formulations and improves their use life, emulsion stability, and freeze-thaw stability, such as in paint strippers, cleaners, perfume concentrates, paste waxes, and the like. It is particularly advantageous in paint removers since the inclusion of paraffin wax can also improve the stripping efficiency by retarding evaporation of ingredients such as water and other volatiles that enhance stripping, improve flow characteristics and cling of the stripper to vertical surfaces, permit the use of less stripper, and, because it does not dry out, improve water rinsing.

One such paint stripper formulation which can benefit from this invention is disclosed in commonly owned, copending application Ser. No. 777,865, filed Oct. 6, 1991, the entire specification of which is incorporated herein by reference. This application describes a formulation containing a water-in-oil emulsion where the "oil" phase is a mixture of organic solvents comprised of a benzyl (or methylbenzyl) ester and, preferably, a benzyl (or methylbenzyl) alcohol and (to some extent) formic acid. The ester is preferably formed in situ by reaction of the alcohol and acid.

SUMMARY OF THE INVENTION

A water-in-oil emulsion having a reduced rate of evaporation is provided wherein a small, effective amount of paraffin wax is incorporated in the organic phase of the emulsion.

Preferred embodiments of the invention involve paint stripper formulations incorporating such emulsions.

DETAILED DESCRIPTION OF THE INVENTION

It has now been found that by incorporating a small percentage of paraffin wax into the organic phase of a water-in-oil emulsion the evaporation rate can be reduced by greater than 90%. This is particularly useful in paint removers.

This retardation of evaporation is achieved by a combination of factors such as dissolving the wax in the continuous, organic phase of the emulsion; employing an organic phase in which the paraffin wax is soluble, but preferably minimally soluble, such as using an amount of wax which is slightly in excess (1% by weight) of that which would saturate the organic phase; and, so as to reduce flammability, having the bulk of this organic phase less volatile than water.

There are many materials (or combinations thereof) which may serve as the organic phase of the emulsion, depending on the end use, such as hydrocarbons (including petroleum distillates, both aromatic and aliphatic), alcohols, ketones, ethers, esters, and amines.

The amount of paraffin wax incorporated in the emulsion is normally from about 0.02 to 5.0 percent by weight, based on the total weight of the emulsion, more typically from about 0.1 to 1.0%. Any type of commercially available paraffin wax can be used, most of which have a melting point in the range of about 47 to 65 degrees Centigrade.

With reference to said aforementioned Serial No. 777,865, a paint stripper formulation employing such an emulsion can be made by mixing together a benzyl alcohol (and, if desired, formic acid); water; paraffin wax; thickeners (such as a hydroxyethyl or hydroxypropyl cellulose); up to about 15% by weight of a hydrocarbon solvent (such as $C_9$, $C_{10}$, $C_{11}$, or $C_{12}$ aromatic petroleum distillates, or mixtures thereof) to help wet the thickener and dissolve the wax; surfactants (such as an imidazoline); up to about 15% by weight of a hydroxide such as ammonium hydroxide in place of formic acid for a formulation on the alkaline side, or sodium hydroxide if formic acid is present; corrosion inhibitors (such as 2-mercaptobenzotriazole or sodium silicate); and, if desired, a small amount (usually no more than 0.1 to 0.3 grams per gallon) of a dye.

Two examples of such paint remover formulations are as follows:

| Ingredient | % By Weight |
| --- | --- |
| FORMULATION A | |
| water | 57.00 |
| benzyl alcohol | 25.00 |
| formic acid (90%) | 12.00 |
| $C_{10}$ aromatic petroleum distillate | 3.85 |
| 2-mercaptobenzothiazole | 0.80 |
| oleic hydroxyethyl imidazoline | 0.70 |
| sodium hydroxide (50%) | 0.30 |
| hydroxypropyl cellulose | 0.20 |
| paraffin wax | 0.15 |
| green dye (about 0.1 gram/gallon) | — |
| FORMULATION B | |
| water | 50.30 |
| benzyl alcohol | 31.20 |
| ammonium hydroxide (30% $NH_3$) | 10.00 |
| $C_{10}$ aromatic petroleum distillate | 6.80 |
| oleic hydroxyethyl imidazoline | 0.70 |
| sodium silicate | 0.30 |
| hydroxypropyl cellulose | 0.25 |
| 2-mercaptobenzothiazole | 0.25 |
| paraffin wax | 0.20 |
| blue dye (about 0.1 gram/gallon) | — |

What is claimed is:

1. A paint stripper formulating process for preparing a paint stripper comprising benzyl alcohol, water and a natural or synthetic wax; characterized in that the process comprises the step of adding from 0.02 to 5.0 percent by weight wax to a continuous benzyl alcohol phase of a water-in-oil emulsion to retard evaporation of water from a discrete aqueous phase, wherein the wax is slightly in excess of the amount which would saturate the benzyl alcohol phase.

2. The process of claim 1 where the wax is paraffin wax in excess by about 1% by weight of the amount which would saturate the benzyl alcohol phase.

3. The process of claim 2 where the paraffin wax has a melting point in the range about 47 to 65° C.

4. The process of claim 3 where the emulsion contains a hydroxyethyl or hydroxypropyl cellulose thickener.

5. The process of claim 4 where the emulsion contains oleic hydroxyethyl imidazoline.

6. The process of claim 5 where the emulsion contains 2-mercaptobenzothiazole.

7. The process of claim 1 where the aqueous phase contains ammonia.

8. A process for preparing a paint stripper water-in-oil emulsion comprises mixing benzyl alcohol; water; hydroxyethyl or hydroxypropyl cellulose thickener; paraffin wax dissolved in an aromatic petroleum distillate; oleic hydroxyethyl imidazoline, 2-mercaptobenzothiazole and ammonium hydroxide.

9. The process of claim 8 where the paraffin wax comprises 0.10 to 0.30 percent by weight of the total weight of the water-in-oil emulsion.

10. The process of claim 9 where the paraffin wax comprises 0.15 to 0.25 percent by weight of the total weight of the water-in-oil emulsion.

11. The process of claim 10 where sodium silicate is added to the water-in-oil emulsion in an amount of about 0.30 percent by weight.

12. A process for preparing a paint stripper water-in-oil emulsion comprises mixing benzyl alcohol; formic acid; water; sodium hydroxide; hydroxypropyl cellulose thickener; oleic hydroxyethyl imidazole; 2-mercaptobenzothiazoline and paraffin wax dissolved in an aromatic petroleum distillate.

13. The process of claim 12 where the paraffin wax comprises 0.10 to 0.20 percent by weight of the total weight of the water-in-oil emulsion.

* * * * *